United States Patent [19]

Libor et al.

[11] Patent Number: 5,120,344
[45] Date of Patent: Jun. 9, 1992

[54] METHOD FOR PRODUCING A BARRIER LAYER IN SOIL

[75] Inventors: Oszkár Libor; Gábor Nagy; Tamás Székely, all of Budapest; Rudolf Mester, Budaörs; Kálmán Kazareczki, Budapest; Tibor Müller, Szolnok; Jenő Kiss, Budapest; Zoltán Sághi, Székesfehérvár; Ádám Hosszu, Budapest, all of Hungary

[73] Assignees: Általános Iparfejlésztési Rt.; Vizépitoöipari Tröszt, both of Budapest, Hungary

[21] Appl. No.: 747,467

[22] Filed: Aug. 13, 1991

Related U.S. Application Data

[63] Continuation of Ser. No. 306,031, Feb. 2, 1989, abandoned.

[51] Int. Cl.⁵ .................. C05G 3/00; C05G 3/04; C09K 17/00
[52] U.S. Cl. ........................ 71/27; 71/903; 71/904; 71/3; 524/446; 405/264; 106/900
[58] Field of Search ............ 71/1, 3, 11, 27, 903, 71/904; 524/446, 448; 405/263, 264; 106/287.1, 900; 97/57.6, 9

[56] References Cited

U.S. PATENT DOCUMENTS

| | | | |
|---|---|---|---|
| 3,772,893 | 11/1973 | Eilèrs | 61/36 R |
| 4,600,744 | 7/1986 | Libor et al. | 524/446 |
| 4,669,920 | 6/1987 | Dymond | 252/8.551 X |

*Primary Examiner*—Ferris Lander
*Attorney, Agent, or Firm*—Schweitzer Cornman & Gross

[57] ABSTRACT

The present invention relates to a method for producing a closing layer which improves the water and nutrient retention of soils, particularly of sandy soils, characterized in that a layer of clay mineral/polymer gel capable of binding and releasing water in a reversible manner is introduced into the soil, preferably 20–60 cm below the soil surface, in such a way that a clay mineral is reacted either before or after or during activation in the presence of water, with 0.5–30% by weight, calculated for the weight of the clay mineral, of one or more water-soluble polymer capable of reacting with the clay mineral, the water content of the resulting gel is adjusted either before or after or during the reaction to a value at which the resistance of medium of the gel is at least three times higher than that of a polymer-free suspension containing the same amount of the clay mineral, if a non-activated clay mineral has been applied as starting substance, the clay mineral is activated with an alkaline activating agent after reacting it with the polymer, and, if desired, further amounts of a water-soluble polymer, one or more water-insoluble swelling xerogel capable of at least 100% water uptake and forming swollen particles less than 1 mm in diameter and/or one or more chemical for agricultural use, preferably a plant nutrient, a fungicidal substance acting against soil-borne fungi and/or a plant growth increasing substance, is added to the gel either before or after or during the reaction with the polymer, and/or, if desired, the gel and the non-reacted polymer molecules are cross-linked with an aldehyde, and finally the thus-formed gel layer is covered with a soil layer.

13 Claims, No Drawings

METHOD FOR PRODUCING A BARRIER LAYER IN SOIL

This is a continuing application of U.S. Ser. No. 306,031, filed on Feb. 2, 1989, now abandoned.

The invention relates to a method for producing a closing layer which improves the water and nutrient retention of soils.

It is known that sandy soils, particularly the arid and semiarid areas, are of poor water and nutrient retention ability. Water entering sandy soils either from natural resources (such as rainfall or snowfall) or as artificial watering (such as rainfall-irrigation, droplet irrigation, subterranean irrigation etc.) moves down relatively quickly to the deeper soil layers, wherefrom the roots cannot take up water, thus water becomes unaccessible for the plants. Water, when moving down to the deeper layers of soil, washes away a part of nutrients applied to the soil surface e.g. as fertilizers, too, which increases the water and chemical requirements of agricultural treatments and simultaneously leads to environmental pollution.

Several attempts have been made to improve the water and nutrient retention ability of sandy soils by utilizing appropriate closing layers. Thus it is known that a thin watertight layer made of plastic foil or bitumen emulsion can be placed into sandy soils 20-60 cm below the soil surface, which layer impedes the leakage of water entering the soil (Horánszky, Szabó, Turi: Műanyagok a mezőgazdaságban/Plastics in Agriculture; in Hungarian/ pp. 243-249; Műszaki Könyvkiadó, Budapest, 1979).

A great disadvantage of this method is that extraneous substances are introduced into the soil in great amounts. These substances decompose in the soil rather slowly, sometimes through decades, thus they contaminate the soil and cause environmental pollution for a long period of time. The roots of the plants cannot pass through the plastic and bitumen emulsion layers, thus root development gets distorted, which, after a more or less prolonged period, impedes the development of the overground plant parts as well. The water-tight membranes applied so far considerably suppress the through-flow of air, vapour and gases, i.e. worsen the ventilation of soil, whereupon the biological functions of the aerobic soil microorganisms slow down and their activity is hindered.

Thus there is a great need for a closing layer which appropriately improves the water and nutrient retention of soils, but does not cause environmental pollution, does not give rise to difficulties in the subsequent agricultural work on the treated area, and has no harmful effects on the natural development of plants and on the activity of soil microorganisms.

Now it has been found that gels with specific structure formed from clay minerals and polymers which are able to take up and release water in a reversible manner completely fit for the above requirements.

It is known from Hungarian patents Nos. 186,325 and 189,280 and from the published Hungarian patent applications Nos. 4721/84 and 3386/84 that certain specific swellable clay minerals can be reacted with water-soluble polymers to form gels of stable structure which can take up and release water in a reversible manner. It is also known that such gels, when admixed with soil as discrete gel particles, regulate the water household of the soil, since the gel particles are able to take up water from the soil and to transfer their water content to the roots of the plants. However, it has not been known that the stronger roots of plants are able to perforate the layers formed from such gels in such a way that the gel sticks firmly to the roots at the place of perforation, i.e. no gap is formed on the water-tight layer. It has not been known, either, that layers formed from such gels do not impede the normal ventilation of soil; air, gases and vapours, although with decreased flow rate, can pass through the gel layers. Due to these favourable properties the gel layers do not affect the normal development of plants and the biological functions of soil microorganisms. These experiences are very surprising, since, based on the references cited above, one had to conclude that clay mineral/polymer gels behave just like plastic foils, thus their use as water-tight layer would lead necessarily to distorted root development and hindered microbial activity.

Based on the above, the invention relates to a method for producing a closing layer which improves the water and nutrient retention of soils, particularly of sandy soils. According to the invention a layer of clay mineral/polymer gel capable of binding and releasing water in a reversible manner is introduced into the soil, preferably 20-60 cm below the soil surface, in such a way that a clay mineral is reacted either before or after or during activation, in the presence of water, with 0.5-30% by weight, calculated for the weight of the clay mineral, of one or more water-soluble polymer capable of reacting with the clay mineral, the water content of the resulting gel is adjusted either before or after or during the reaction to a value at which the resistance of medium of the gel is at least three times higher than that of a polymer-free suspension containing the same amount of clay mineral, if a non-activated clay mineral has been applied as starting substance, the clay mineral is activated with an alkaline activating agent after reacting it with the polymer, and, if desired, further amounts of a water-soluble polymer, one or more water-insoluble swelling xerogel capable of at least 100% water uptake and forming swollen particles less than 1 mm in diameter and/or one or more chemical for agricultural use, preferably a plant nutrient, a fungicidal substance acting against soil-borne fungi and/or a plant growth increasing substance, is added to the gel either before or after or during the reaction with the polymer, and/or, if desired, the gel and the non-reacted polymer molecules are cross-linked with an aldehyde, and finally, the thus-formed gel layer is covered with a soil layer.

The clay mineral/polymer gels can be prepared as described in the Hungarian patents or patent applications cited above. In harmony with these publications, the term "clay mineral" as used in the specification and claims refers solely to swelling phyllosilicates of three-layer structure and chain silicates, as well as to rocks, mine products and artificial mixtures containing at least 10% by weight, preferably 20-50% by weight, of such swelling silicates. Of the clay minerals usable according to the invention the following are mentioned: sodium bentonite, calcium bentonite in activated state (e.g. treated with a sodium salt or with another activating agent), illite, attapulgite, allevardite, hectorite, nontronite, etc. Natural clay minerals are utilized preferably in activated state, since in such state they can react much more easily with the polymer. The elementary lamellae or chains of the clay mineral "get stringed" on the polymer chain at the reactive sites, which ensures the irreversible fixation (stabilization) of the gel structure. The term "activation" refers to any of the known methods applied to increase the swelling ability of clay minerals (e.g. kneading them with sodium carbonate, etc.). Upon activation the starting clay mineral is disintegrated mainly to its elementary lamellae or chains, and these lamellae or chains react with the polymer.

If a non-activated clay mineral has been reacted with the polymer, the reaction product is subsequently activated by treating it with an alkaline activating agent. Overactivated clay minerals, i.e. clay minerals containing an excessive amount of activating agent, can also be used for this purpose. Disintegration proceeds upon this subsequent activation as well, and the liberated reactive sites of the clay mineral react with the polymer to form a gel with stabilized structure.

In harmony with the publications cited above, any water-soluble polymer capable of reacting with the clay mineral can be applied as water-soluble polymer in the gel-forming reaction, of which those containing —COOH, —COO$^-$M$^+$ (M$^+$ is a monovalent cation), —CONH$_2$, —OH and/or —C—O—C— functional groups are to be mentioned. Examples of the water-soluble polymers are polyacrylamide, polymethacrylamide, polyacrylic acid, polymethacrylic acid, hydrolysed polyacrylamide, copolymers of acrylamide and acrylic acid, copolymers of hydrolysed acrylamide and acrylic esters, copolymers of vinyl alcohol and acrylic acid, polyvinylalcohols, hydrolysed polyvinyl esters, polyethylene oxides, water-soluble polysaccharides etc. or mixtures of those homo- or copolymers. Graft copolymers can be utilized as well; of these copolymers containing acrylic acid, methacrylic acid, acryl amide and/or methacryl amide side chains grafted onto a cellulose chain and copolymers grafted with acrylonitrile and hydrolysed to contain —CONH$_2$ and/or —COO$^-$M$^+$ functional groups are to be mentioned.

The molecular weight of the polymers applied may vary generally within 50,000 and 20,000,000, preferably 500,000 and 10,000,000.

It is of essential importance that the water content of the gel should be adjusted either before or after or during the reaction of the clay mineral with the polymer to a value at which the resistance of medium of the gel is at least three times higher than that of a polymer-free clay mineral suspension containing the same amount of the clay mineral.

According to one method the closing layer can be formed in the soil in such a way that the soil is sprinkled with the dry powder of the gel prepared as described above, and then sufficient amount of water is added to the powder whereupon it swells and forms a coherent layer. It is, however, much more simple, economic and advantageous to introduce the gel into the soil as a hydrogel (i.e. as a water-containing gel) at the rate of its formation. In this event one proceeds as follows: One of the containers of a power machine equipped with two containers is filled with one of the reagent or reagen mixture of gel formation, whereas the other reagent or reagent mixture is filled into the second container. At the outlets of the containers the reagents, supplied in a pre-adjusted ratio, are intensely admixed with one another, and the resulting gel-forming mixture is introduced immediately into the soil, wherein the reaction preceeds and gel is formed within a short period of time (generally 1-100 seconds). The gel formed reaches its final mechanical properties generally within maximum one day. Examples of the liquid pairs to be filled into the containers are as follows:

| Container 1 | Container 2 |
| --- | --- |
| aqueous suspension of an activated clay mineral | aqueous solution of a polymer |
| aqueous suspension of a non-activated clay mineral | aqueous solution of a polymer + activating agent (e.g. sodium carbonate) |
| aqueous suspension of a reaction product formed from a polymer and a non-activated clay mineral | activating agent (e.g. an aqueous suspension of over-activated bentonite or an aqueous solution of Na$_2$CO$_3$ |

As described in the Hungarian patent applications Nos. 4721/84 and 3386/84, optionally a particulate water-insoluble xerogel with high swelling ability can be built into the gel structure and/or one or more agricultural chemical(s) can be added to the gel. These substances can also be admixed with the pre-formed gels. If desired, the gel structure can be cross-linked by treating the gel with an aldehyde.

According to a particularly preferred method the containers comprising the two liquid components are mounted onto a power machine, and a wing plough is adjusted to the power machine. The liquid components which flow out of the containers are pumped in a pre-adjusted ratio, through a corrugated tube, to the pipe junction of the wing plough, wherefrom the mixture of the two liquid components enters directly the soil. Upon the movement of the power machine the covering soil layer, 20-60 cm in thickness, lifted by the plough falls down and covers the gel layer, which is now solid enough to resist the mechanical damaging effects of the heavy soil layer.

If the soil which surrounds the gel is dry, the hydrogel transfers the majority (about 50-75%) of its water content to the soil, whereupon the gel contracts in proportion to the loss in its water content. If the soil layer above the hydrogel is saturated with water either from natural or artificial resources, the hydrogel swells as well, and this drying (contracting)-wetting (swelling) process proceeds for a great number of times in a reversible manner. Salts of alkali metals and water-soluble non-ionic organic molecules do not influence the swellability of the hydrogel, whereas aqueous solutions of polyvalent metal ions and organic or mineral compounds of acidic character decrease the swellability of the hydrogel. The swellability of the hydrogel can be, however, restored with alkaline activating agents, e.g. sodium carbonate or sodium phosphate. This treatment is performed preferably at the end of the cultivation period after harvest, and the activating agent is led to the hydrogel preferably together with the irrigation water.

The invention is described in detail by the aid of the following non-limiting examples.

EXAMPLE 1

2 m$^3$ of an aqueous suspension of F2 type activated bentonite (produced by Országos Érc—és Ásványbányák Vállalat, Mád, Hungary) with a dry substance content of 15% by weight were filled into one of the containers of a 110 KW power machine equipped with two containers. 500 liters of an aqueous polyacrylamide solution with a dry substance content of 2% by weight were filled into the second container. The pumps of the power machine supplied the two liquids in a volume ratio of 4:1. The two liquids were intensely mixed. A wing plough was attached to the power machine, and the mixture of the two liquids was pumped, through a corrugated tube, to the pipe junction of the plough at a rate of 0.1 m³/min. The mixture, in which gellification had already been started, moved vertically downward in the shaft of the wing plough, then the direction of movement changed by 90°, and the mixture was passed through an orifice of about 4 mm in thickness and 600 mm in length. The gel-spreading tool was mounted into the hind part of the wing plough inside the upper cover plate. The power machine moved with a speed of 3 km/hour, and introduced an even gel strip, about 3-4 mm in thickness, into the soil. After about 25 minutes of operation the containers were filled up again, and the work was continued.

At the same time and using the same wing plough a subirrigation tube was also embedded into the soil about 10 cm above the gel layer. The subirrigation tube was placed 45 cm below the surface, whereas the gel layer was formed 55 cm below the surface.

This arrangement was applied in vine lands where the individual rows of vine were spaced 3 m apart one another. In the control rows the subirrigation tube was embedded into the soil at the same distance together with a PVC foil 60 cm in width.

After one year of cultivation a crop yield increase of 15% was observed in the rows supplied with a closing gel layer according to the invention in comparison with the control rows wherein PVC foil was applied as water-tight layer.

EXAMPLE 2

The method of Example 1 was followed with the difference that the gel layer was formed 45 cm below the soil surface, and no subirrigation tube was applied. This arrangement was applied in an apple nursery wherein one-year-old seedlings were grown. After one year of cultivation the seedlings growing in the rows equipped with gel layer reached an average height greater by about 10 cm than those growing in the control rows, which corresponds to an increase in development of about 30%.

What we claim is:

1. A process for improving the water and nutrient retention of soil for agriculture, which comprises forming a barrier layer of a clay mineral-polymer gel at a level under the surface of the soil, or forming in situ at a level under the surface of the soil a moisture barrier layer that can be penetrated by the roots of plants, said barrier layer being formed from a gel that is the reaction product of a clay mineral and a water soluble polymer that can enter into a chemical reaction with said clay mineral, wherein the clay mineral-polymer gel is formed by mixing in the presence of water, at said level under the surface of the soil, an activated or nonactivated clay mineral, with one or more water soluble polymers adapted to react with the clay mineral, adjusting the water content, activating the clay mineral if a nonactivated clay mineral was employed, and if the barrier layer was formed while uncovering the level under the surface of the soil, then covering the uncovered part of the gel layer with soil.

2. The process of claim 1, wherein the concentration of the polymer is from about 0.5% to about 30% wt. based on the clay mineral, and wherein said clay mineral-polymer gel layer is at said level at from about 20 to about 60 cm depth under the surface of the soil.

3. The process of claim 1, wherein the clay mineral is a water-swellable phyllosilicate having a three-layer structure, or a chain silicate, or an artificial or natural mineral product containing at least 10% wt. of one or more of said silicates.

4. The process of claim 3, wherein said clay mineral is one or more of a bentonite, illite, attapulgite, allevardite, hectorite, and nontronite.

5. The process of claim 1, wherein said clay mineral is not in active form prior to the mixing thereof with the polymer, and wherein said step of activating comprises increasing the swellability with water of the clay mineral.

6. The process of claim 5, wherein increasing the swellability with water of the clay mineral comprises contacting said clay mineral, or the clay mineral-polymer gel with an alkaline activating agent.

7. The process of claim 1, wherein said step of adjusting the water content comprises before, during, or after mixing the clay mineral with the polymer determining the water content of the clay mineral and the polymer or the gel reaction product thereof, and if required, adding an amount of water so that the resistance medium of the gel reaction product is at least three times higher than a polymer free suspension of the clay mineral.

8. The process of claim 1, wherein said water soluble polymer has a molecular weight of from about 50,000 to about 20,000,000, and contains a carboxylic, hydroxyl, or carboxylamino functionality, or a $-COOM^+$ wherein $M^+$ is a monovalent cation, or $-C-O-C$ moiety.

9. The process of claim 8, wherein said water soluble polymer has a molecular weight of from about 500,000 to about 10,000,000, and is one or more of polyacrylamide, polymethacrylamide, polyacrylic acid, polymethacrylic acid, hydrolysed polyacrylamide, a copolymer of acrylamide and acrylic acid, a copolymer of hydrolyzed acrylamide and an acrylic ester, a copolymer of vinyl alcohol and acrylic acid, a polyvinylalcohol, a hydrolyzed polyvinyl ester, a polyethylene oxide, a polysaccharide, and a graft copolymer.

10. The process of claim 1, which comprises intensely mixing the ingredients of the gel which comprise clay mineral, water soluble polymer, and water to form a hydrogel, and introducing the hydrogel thus formed into the soil.

11. The process of claim 1, further comprising adding one or more of at least one water-insoluble xerogel, and at least one agricultural additive to the gel formed from the clay mineral and the polymer.

12. The process of claim 11, wherein said agricultural additive is a plant nutrient, fertilizer, fungicide, and plant growth increasing substance.

13. The process of claim 1, further comprising planting a vine or tree seedling into the covering soil.

* * * * *